United States Patent Office 3,505,420
Patented Apr. 7, 1970

3,505,420
TRICYCLODECADIENES
Yves Amiard and Pierre Legendre, Pau, France, assignors to Societe Nationale des Petroles d'Aquitaine, Courbevoie, France
No Drawing. Filed June 4, 1968, Ser. No. 734,193
Claims priority, application France, June 6, 1967, 109,303
Int. Cl. C07c 1/00
U.S. Cl. 260—666                    21 Claims

ABSTRACT OF THE DISCLOSURE

This invention relates to a process for the preparation of tricyclodecadienes which are substituted in at least the 5-position, the process consists of causing the reaction, in the presence of a base as catalyst, of 2 molecules of cyclopentadienes, at least one of which carries in the 5-position a hydrocarbon substitution connected by a double bond to the 5-carbon atom, it being possible for the second cyclopentadiene molecule to be either substituted or unsubstituted.

BACKGROUND OF THE INVENTION

It is common practice to produce compounds which are designated by the generic term of "fulvenes" by the action of an optionally-substituted cyclopentadiene or an aldehyde or a ketone, in the presence of a base. Such compounds show a strong tendency to resinification. It frequently happens that the product obtained is of a completely tar-like nature and it is impossible, as pointed out in U.S. Patent No. 3,051,765, near the bottom of column 1, to recover the desired fulvene. Now, it has been realized that some of the derivative products of fulvene would have excellent elastomer properties when polymerized, but this tar-like nature of fulvene has prohibited further operation on the molecule. For instance, it would be very desirable to use the Diels-Alder condensation mechanism utilizing fulvene and the original starting chemical to create the useful monomer, but the nature of fulvene has prevented this. These and other difficulties experienced with the prior art devices have been obviated in a novel manner by the present invention.

It is, therefore, an outstanding object of the invention to provide a process for obtaining certain new polycyclic compounds which are useful for obtaining elastomers to be obtained from fulvenes or from the reaction medium used in their preparation.

Another object of this invention is the provision of a process for obtaining tricyclodecadienes by obtaining fulvenes as an intermediate product without, at the same time, obtaining a tar-like product.

A further object of the present invention is the provision of a process for producing fulvenes which does not involve the removal of the fulvenes from a tar-like substance.

With the foregoing and other objects in view, which will appear as the description proceeds, the invention resides in the combination and arrangement of steps and the details of the composition hereinafter described and claimed, it being understood that changes in the precise embodiment of the invention herein disclosed may be made within the scope of what is claimed without departing from the spirit of the invention.

SUMMARY OF THE INVENTION

In general, the homologous series of the product of the invention can be represented by the general formula:

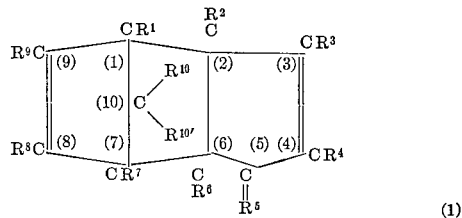
(1)

in which each of the radicals $R^1$ to $R^4$ and $R^6$ to $R^{10}$ and $R^{10'}$, which are like or different, can be hydrogen, halogen, alkyl, cycloalkyl, aryl, aralkyl or alkaryl; $R^5$ indicates a group of the type $R^{11}$—C—$R^{12}$, where $R^{11}$ and $R^{12}$ belong to the same classes as $R^1$ to $R^{10'}$, or is even formed by an aliphatic ring, particularly a cyclopolymethylene ring,

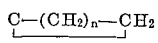

more especially tetramethylene or pentamethylene.

The radicals $R^{10}$ and $R^{10'}$ can likewise together form a cycloaliphatic radical, in which case, the carbon atom in the 10-position carries a cyclic group

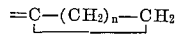

instead of one of the two groups $R^{10}$ and/or $R^{10'}$, or hydrogen atoms.

Appearing among the most usual compounds according to the invention are those in which some of the symbols $R^1$ to $R^4$ and $R^6$ and $R^{10'}$ are relatively light radicals, particularly with 1 to 6 carbon atoms, such as methyls, ethyls, propyls, phenyls, cyclopentyls, the others being hydrogen atoms; in all cases, $R^5$ is a hydrocarbon substituent, for example, propylidene $CH_3$—C—$CH_3$, butylidene $CH_3$—$CH_2$—C—$CH_3$, etc., and more particularly cyclopentylidene

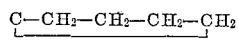

or cyclohexylidene

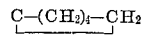

The invention is thus more particularly concerned with alkylidene- or cycloalkylidene-5-tricyclo[5,2,1,0$^{2,6}$]-decadi-3,8-enes, which are optionally substituted, and, more particularly, the monocyclopentylidene-5- and dicyclopentylidene-5,10-derivatives of these tricyclodecadienes. Thus, one of the new compounds according to the invention which is highly useful comprises a cyclopentylidene group in position 10 of the Formula 1, as substituents $R^{10}$ and $R^{10'}$.

The process, according to the invention, consists in causing the reaction together, in the presence of a basic catalyst, of two molecules of cyclopentadiene, of which at least one carries, in the 5-position, a hydrocarbon substitution which is connected by a double bond to the carbon atom at 5, it being possible for the other molecule to be substituted or unsubstituted.

The said hydrocarbon substitution is particularly an alkylidene or a cycloalkylidene. It can be similar to or different from the eventual substitution of the other reacting molecule.

DESCRIPTION OF THE PREFERRED EMBODIMENT

In its practical operation, the invention relates to a new series of homologous polycyclic compounds, of which at least one of the rings is that of norbornene. It relates more particularly to optionally substituted mono- and di-cycloalkylidene-tricyclodecadienes. The invention is also concerned with a process for the preparation of these new substances.

In the simplest case, where only one of the two molecules comprises a substitution in the 5-position, the reaction can be written:

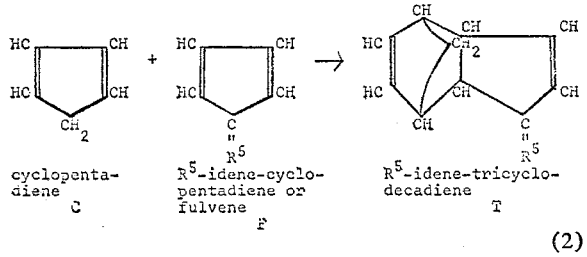

cyclopenta-   $R^5$-idene-cyclo-   $R^5$-idene-tricyclo-
diene         pentadiene or        decadiene
C             fulvene              T
              F (2)

In the cyclopentadiene C, one or more of the hydrogen atoms can be replaced by substituents, such as halogens; alkyls, particularly with 1 to 30 carbon atoms; aryls, particularly phenyl, which can carry one or more alkyls containing, for example, 1 to 12 carbon atoms, and/or other groups. Thus, the cyclopentadiene C can be replaced by one of its derivatives, as for example methyl, dimethyl, trimethyl, ethyl, diethyl, triethyl, dimethylethyl, butyl, amyl, phenyl, p-methylphenyl, phenylmethyl, phenylether, chloro, dichloro, trichloro, dibromo, hexyl, dihexylcyclopentadiene or others. It can optionally be replaced by the $R^5$-idene cyclopentadiene, that is to say, by fulvene, not strictly the same as F, which constitutes the second reacting molecule as represented above in the Equation 2.

The cyclopentadiene substituted in the 5-position, or fulvene F can be any fulvene with an aliphatic, cycloaliphatic, aromatic or mixed $R^5$ hydrocarbon group. It can be the unsubstituted fulvene, of which the part of the molecule $>C=R^5$ is $>C=CH_2$, or even a fulvene substituted with one or more alkyls—particularly containing 1 to 30 carbon atoms—or one or more aryls, aralkyls and/or alkaryls; such substituted fulvenes are for example the methyl, dimethyl, ethyl, diethyl, methylethyl, propyl, dipropyl, propenyl, butyl, isobutyl, diisobutyl, capryl, dihexyl, cyclohexyl, phenyl, diphenyl, methylphenyl, tolyl, ditolyl or cyclopentyl fulvene, etc., that is to say, compounds of which the part $>C=R^5$ is, for example, $>C=CH-CH_3$; $>C=C(CH_3)_2$; $>C=CH-C_6H_5$; $>C=C(C_6H_5)_2$, and more especially

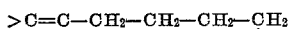

in this latter case, the compound, which is cyclopentylidene-5-cyclopentadiene, can also be called cyclotetramethylene fulvene.

The fulvenes which can be used in the present invention may, in addition, carry one or more substitutions on the carbon atoms ending at double bonds, as is clear from the explanations given above with respect to the Formula 1 and the groups $R^2$, $R^3$, $R^4$, and $R^5$.

The preferred proportions of reactants are 1 mol of C to 1 mol of F, corresponding to the stoichiometry of the reaction (2).

The catalysts of condensation agents of the reaction (2) are highly basic compounds of all types, as for example, the alkaline bases, sodium, potassium or lithium alcoholates, organic salts or alkali minerals, primary and/or secondary amines, etc. The reaction is thus generally caused by the same agents as those which are used in the manufacture of fulvenes by condensation of cyclopentadienes with aldehydes or ketones. Sodium ethylate or sodium methylate are particularly suitable for this preparation.

The reaction (2) of the invention is catalyzed by the same substances as the known reaction for the preparation of fulvenes:

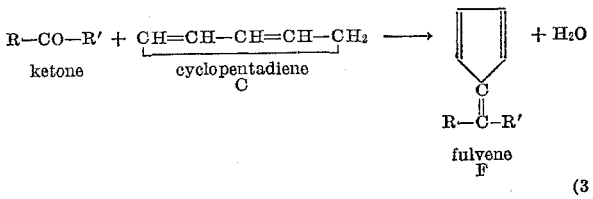

(E. P. Kohler and J. Kable, J.A.C.S. 57, May 1, 1935, p. 917; U.S. Patent 3,051,765).

Therefore, the inventive process can be carried out directly, starting with cyclopentadiene and a ketone or an aldehyde, instead of the fulvene prepared in advance. In other words, according to this embodiment of the invention, the preparation of the new compounds is effected in the same medium and in a single and same working phase with the formation of fulvene; however, it is then necessary to have a proportion of cyclopentadiene which is larger than for the reaction (3). In principle, this proportion should be double, i.e., 2 mols of C to 1 mol of ketone or aldehyde, since 1 mol of C is necessary according to (3) for forming F and then 1 mol according to (2) for obtaining T:

(3)             ketone$+C \rightarrow F$ (2)             $F+C \rightarrow T$ and thus (4)             ketone$+2C \rightarrow T$ In actual fact, since the fulvene F according to the known Equation 3 is generally only obtained with a molar yield of about 40 to 50% with respect to C, the quantity of this latter can be reduced to the same extent. Consequently, the proportion of 2 mols of C per mol of ketone or aldehyde is not obligatory, although it is preferable. Nevertheless, the quantity of cyclopentadiene to be used is such that there is at least 1 mol thereof per mol of fulvene formed, in addition to that which was needed for forming this latter.

In practice, in the form of the invention which consists in starting directly with a ketone or an aldehyde, without previous preparation and separation of the fulvene, the proportion of optionally substituted cyclopentadiene is at least 1.5 mols per mol of ketone or aldehyde and is preferably equal to or close to 2 mols. The method consists in the slow, drop-by-drop introduction of the mixture of reactants into the alkali condensation agent, used in the form of an aqueous alcoholic solution. The proportion of alkali agent should be relatively large, preferably about 0.2 to 1 mol of alkali base per mol of cyclopentadiene.

The process can be carried out at various temperatures, especially from $-30°$ up to $190°$ C., depending on the nature of the reactants and the condensation agents which are used. It is generally preferable to work between $-10°$ and $+30°$ C., the low temperatures favoring the preservation of the cyclopentadiene in the monomer state.

The reaction periods obviously depend on the temperature and pressure, as well as the nature and concentration of the compounds which are present. These periods usually vary from 30 minutes to 48 hours. It is desirable to shorten the contact time when the products start to become resinified.

When the reaction is over, the reaction medium is diluted with water and then extraction takes place by means of an organic solvent, such as chloroform, in the well-known manner.

The invention is illustrated by the following examples.

EXAMPLE 1

To a solution of 23 g. of sodium (1 atom) in 275 ml. of anhydrous methanol, at a temperature of 0° C. and, while stirring vigorously, there is added drop-by-drop a mixture of 132 g. of freshly distilled cyclopentadiene (2 mols) and 84 g. of cyclopentanone (1 mol).

After 1 hour, the reaction mixture is washed with water until the aqueous solution has a neutral pH value. The products of the reaction are then extracted several times with chloroform. The chloroform solution is dried and the chloroform is eliminated by evaporation under vacuum. The separation of the products which have not entered into reaction (cyclopentanone, cyclopentadiene, possibly in monomer form, and dicyclopentadiene formed by dimerization) is continued. The residue, thus freed from these initial constituents, is 72 g.

Analysis shows that the product contains cyclotetramethylene fulvene and the new compounds according to the invention:

(I) Cyclopentylidene-5-tricyclo[5,2,1,0$^{2,6}$]-decadi-3,8-ene, which is the compound of Formula 1, given above, in which $R^1$ to $R^4$ and $R^6$ to $R^{10'}$ are hydrogen atoms, while $R^5$ is a cyclopentylidenyl group;

(II) Dicyclopentylidene-5,10-tricyclo[5,2,1,0$^{2,6}$]-decadi-3,8-ene, deriving from the Formula 1 by replacement of $R^{10}$ and $R^{10'}$ by means of a cyclopentylidenyl group, the same as in $R^5$; in other words, each of the positions 5 and 10 is formed by:

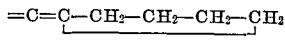

while $R^1$ to $R^4$ and $R^6$ to $R^9$ are hydrogen atoms.

By distillation under reduced pressure, between 0.1 and 0.8 mm. Hg, there are separated fractions which are respectively rich in the aforementioned compounds. The major part of tetramethylene fulvene is eliminated at 44–47° C./0.1 mm. Hg.

Between 60° C./0.2 mm. and 98° C./0.7 mm, the major part of compound (I) is collected.

A product rich in compound (II) is obtained between 116 and 134° C./0.8 mm. Hg.

After purification, the structure of the compounds (I) and (II) is confirmed by ultraviolet spectroscopy, by magnetic resonance, and by determination of the molecular weight.

(I) For this compound of molecular weight 198, there is found an ultraviolet absorption spectrum in ethanol with $\lambda_{max.}$ at 243.5 millimicrons; $\epsilon_m=16,000$. Melting point: 5 to 10° C.

(II) This compound, for which a molecular weight of 268 (theoretical 264) is found, has an ultraviolet absorption spectrum in ethanol with $\lambda_{max.}$ at 245 millimicrons, $\epsilon_m=22,000$. Melting point: 76–77° C.

EXAMPLE 2

To a solution of 40 g. of sodium hydroxide in a mixture of water and methanol (40 ml. of $H_2O+150$ ml. of $CH_3OH$) at 0° C., and while stirring vigorously, there is added drop-by-drop a mixture of 66 g. of freshly distilled cyclopentadiene (1 mol) and 42 g. of cycolpentanone (0.5 mol).

The contact between the reactants is maintained for 4 hours. The reaction mixture is washed with water until the aqeuous solution is neutral. The products of the reaction are then extracted several times with chloroform. The solution obtained is dried and the chloroform is eliminated by evaporation under vacuum. The separation of the products which have not entered into the reaction (cyclopentanone, cyclopentadiene and dicyclopentadiene) is continued. The residue, thus freed from its starting constituents, is 52.5 g.

Analysis shows that the mixture contains cyclotetramethylene fulvene and the compounds of formulae I and II. It is subjected to distillation under strong vacuum to obtain the cyclotetramethylene fulvene and the compounds (I) and (II). By fractionation at 0.4 mm. Hg, 12.9 g. of cyclotetramethylene fulvene are eliminated between 47° and 53° C., and 33.9 g. of a mixture of compounds (I) and (II) are collected between 57° and 132° C. The major part of compound (I), about 22 g., distills between 57° and 86° C., while the product (II) distills over particularly between 86° and 132° C./0.4 mm. Hg, at the rate of about 11 g.

EXAMPLE 3

To a solution of 64 g. of diethylamine in 100 ml. of methanol at 0° C., while stirring vigorously, there is added a mixture of 115.5 g. of freshly distilled cyclopentadiene (2.1 mols) and 73.5 g. of cyclopentanone (0.873 mol). The contact between these different reactants is maintained for 24 hours. After 1 hour, the reaction mixture is washed with water until the aqueous solution is neutral. The products of the reaction are then extracted several times with chloroform and the following procedure is as in the preceding example. 44 g. of a mixture of the compounds (I), (II) and cyclotetramethylene fulvene are thus obtained.

EXAMPLE 4

A mixture of 10 g. of cyclotetramethylene fulvene and 5 g. of cyclopentadiene is introduced into a solution of 2 g. of sodium in 25 cc. of anhydrous methanol at a temperature of 20° C.

After 1 hour, the reaction mixture is washed with water until the aqueous solution has a neutral pH value. The products of the reaction are then extracted several times with chloroform. Analysis of the solution indicates the formation of the compounds (I) and (II).

The products obtained from the practice of the present invention can be polymerized to obtain an excellent elastomer. The double cyclic structure provides for the stretching of the molecule in the lengthwise direction, particularly if the polymerization takes place by attachment of the ends of the molecule to adjacent, similar molecules. At the same time, the density of the resultant elastomer can be easily regulated by attaching a suitable substituent at a point in the molecule between the ends; this adjustment or selection of the suitable density of the resulting elastomer can usually be accomplished without affecting its elastic properties.

While it will be apparent that the illustrated embodiments of the invention herein disclosed are well calculated adequately to fulfill the objects and advantages primarily stated, it is to be understood that the invention is susceptible to variation, modification, and change within the spirit and scope of the subjoined claims.

The invention having been thus described, what is claimed as new and desired to be secured by Letters Patent is:

1. A process for the preparation of tricyclodecadienes having a substituent in the 5-position, comprising reacting with a basic catalyst 2 molecules of cyclopentadiene, at least one of which is substituted in the 5-position with a cyclic hydrocarbon substituent connected by a double bond to the 5-carbon atom and the second cyclopentadiene molecule is selected from the group consisting of substituted and unsubstituted molecules.

2. A process as recited in claim 1, wherein the 5-position hydrocarbon substitution is of the type

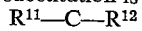

C is connected by a double bond to the carbon atom in the 5-position of the cyclopentadiene, while each of the symbols $R^{11}$ and $R^{12}$ is selected from the class consisting of alkyl, cycloalkyl, aryl, aralkyl, and alkaryl groups.

3. A process as recited in claim 2, wherein the groups $R^{11}$ and $R^{12}$ form together an aliphatic ring.

4. A process as recited in claim 3, wherein the ring is selected from the group consisting of a cyclotetramethylene and cyclopentamethylene ring.

5. A process as recited in claim 1, wherein at least one of the cyclopentadiene molecules carries at least one substituent in the 1 to 4 positions, the substituent being selected from the class consisting of alkyls, cycloalkyls, aryls, aralkyls, and alkaryls.

6. A process as recited in claim 1, wherein the catalyst is selected from the class consisting of basic, inorganic, and organic compounds of an alkali metal.

7. A process as recited in claim 1, wherein the catalyst is an amine base.

8. A process as recited in claim 1, wherein the reaction takes place between $-10°$ and $+30°$ C.

9. A process as recited in claim 1, whereinn the cyclopentadiene substituted in the 5-position is prepared in the reaction medium before its action with the other molecule.

10. A process as recited in claim 9, wherein the formation of the 5-position substituted cyclopentadiene is carried out by bringing 1 mol of a substance selected from the class consisting of ketone and aldehyde into contact with at least 1.5 mol of cyclopentadiene in the presence of the basic catalyst.

11. A process as recited in claim 1, wherein the proportion of basic catalyst is in the range from 0.2 to 1.0 mol of base per mol of cyclopentadiene.

12. A process as recited in claim 1, the product is separated by extraction with solvents from the reaction medium, previously treated with water.

13. Tricyclodecadiene, substituted in the 5-position, formed as tricyclo$(5,2,1,0^{2,6})$-decadi-3,8-ene, of which the carbon in the 5-position is connected by a double bond to thecarbon atom of a substituent $R^{11}$—C—$R^{12}$, in which each of the symbols $R^{11}$ and $R^{12}$ is selected from the class consisting of alkyl, cycloalkyl, aryl, aralkyl, and alkaryl.

14. A tricyclodecadiene as recited in claim 13, wherein the symbols $R^{11}$ and $R^{12}$ form, in common with the C of $R^{11}$—C—$R^{12}$, an aliphatic ring.

15. A tricyclodecadiene as recited in claim 14, wherein the ring is selected from the class consisting of cyclotetramethylene and cyclopentamethylene.

16. A tricyclodecadiene as recited in claim 13, wherein at least one of the hydrogen atoms of the molecule, other than in the 5-position, are replaced by substituents selected from the class consisting of halogens, alkyls, cycloalkyls, aryls, aralkyls, and alkaryls.

17. A tricyclodecadiene as recited in claim 13, wherein the two hydrogen atoms in the 10-position are replaced by a cycloaliphatic group.

18. Tricyclodecadiene as recited in claim 17, wherein the cycloaliphatic group is selected from the group consisting of cyclopentylidene and cyclohexylidene.

19. Cyclopentylidene - 5 - tricyclo$[5,2,1,0^{2,6}]$-decadi 3,8-ene.

20. Dicyclopentylidene - 5,10 - tricyclo$[5,2,1,0^{2,6}]$decadi-3,8-ene.

21. A process for obtaining the monomer tricyclodecadiene substituted in the 5-position, comprising the steps of mixing cyclopentadiene with a substance selected from the class consisting of aldehyde and ketone in the proportion of 2 moles of cyclopentadiene to 1 mole of the substance, introducing the mixture slowly to a base, carrying on the reaction at a temperature in the range from $-30°$ to $190°$ C. to inhibit the formation of tar-like fulvenes, and extracting the product from the reaction mixture.

References Cited

UNITED STATES PATENTS

| | | |
|---|---|---|
| 3,051,765 | 8/1962 | McCain. |
| 3,376,304 | 4/1968 | Mohrbacher. |
| 3,390,156 | 6/1968 | Hurwitz. |

DELBERT E. GANTZ, Primary Examiner

V. O'KEEFE, Assistant Examiner

U.S. Cl. X.R.

260—668